(12) United States Patent
Sergei (10) Patent No.: US 12,025,386 B2
(45) Date of Patent: Jul. 2, 2024

(54) METHOD FOR CONTROLLING HEAT TRANSFER BETWEEN A MAINLY SOLID BASE AND THE AMBIENT MEDIUM

(71) Applicant: Primakov Sergei, Tiumen (RU)

(72) Inventor: Primakov Sergei, Tiumen (RU)

( * ) Notice: Subject to any disclaimer, the term of this patent is extended or adjusted under 35 U.S.C. 154(b) by 0 days.

(21) Appl. No.: 18/084,726

(22) Filed: Dec. 20, 2022

(65) Prior Publication Data

US 2023/0123964 A1 Apr. 20, 2023

Related U.S. Application Data (63) Continuation of application No. PCT/RU2021/050053, filed on Mar. 4, 2021.

(30) Foreign Application Priority Data

Jun. 20, 2021 (RU) .......................... RU2020120526

(51) Int. Cl.
*F28F 13/00* (2006.01)
*F28F 3/00* (2006.01)
*F28F 21/06* (2006.01)

(52) U.S. Cl.
CPC .............. *F28F 13/00* (2013.01); *F28F 21/06* (2013.01); *F28F 3/00* (2013.01); *F28F 2013/008* (2013.01); *F28F 2255/02* (2013.01)

(58) Field of Classification Search
CPC .............. F28F 2225/02; F28F 2013/008; F28F 2255/04; F28F 2013/006; F28F 3/00; E04H 15/36; E04H 15/38

(Continued)

(56) References Cited

U.S. PATENT DOCUMENTS 5,285,728 A * 2/1994 Dolivet ................ H01H 37/323
102/275.1
5,813,454 A * 9/1998 Potter ..................... F28F 13/00
165/96

(Continued)

FOREIGN PATENT DOCUMENTS

| CN | 102535526 A | 7/2012 |
|----|----|----|
| RU | 179729 U1 | 5/2018 |

(Continued)

*Primary Examiner* — Jianying C Atkisson
*Assistant Examiner* — For K Ling

(57) ABSTRACT

Method for controlling heat transfer between a mainly solid base and the ambient medium This invention belongs to the field of construction of shielding and heat-shielding structures. The technical result is changing the degree of useful effect from the regulation of heat transfer depending on the temperature of the plates of the heat control structure.

In the method for regulating heat transfer between a mainly solid base and ambient medium, one plate (2) or at least two plates (2, 5) stacked in layers and interconnected are installed on base (1) at rest temperature, while at least one (2) of the said plates, when its temperature changes relative to the rest temperature, is capable of deforming so that a cavity is formed between this plate and the base or the plate adjacent in the layer, filled with particles of the ambient medium, and fixation points (3) of plate (2) to base (1) or plate (5) adjacent in the layer are selected so that this plate (2) takes a convex shape during deformation.

20 Claims, 10 Drawing Sheets

(58) Field of Classification Search
USPC .......................................... 165/80.3, 96, 101
See application file for complete search history.

(56) References Cited

U.S. PATENT DOCUMENTS

| | | | | |
|---|---|---|---|---|
| 6,330,157 | B1 * | 12/2001 | Bezama | H01L 23/473 |
| | | | | 361/689 |
| 8,720,063 | B2 * | 5/2014 | Campbell | H05K 7/20 |
| | | | | 29/890.032 |
| 2010/0157537 | A1 * | 6/2010 | Yu | F28F 3/02 |
| | | | | 165/182 |
| 2011/0168378 | A1 * | 7/2011 | Hsu | F28F 27/00 |
| | | | | 165/104.26 |
| 2012/0279242 | A1 * | 11/2012 | Seybold | F25B 40/00 |
| | | | | 62/190 |
| 2013/0314202 | A1 * | 11/2013 | Bolton | H01L 23/34 |
| | | | | 337/299 |
| 2017/0160021 | A1 * | 6/2017 | Cognata | F28F 1/14 |
| 2018/0224224 | A1 * | 8/2018 | Bruemmer | F28D 21/0001 |

FOREIGN PATENT DOCUMENTS

| | | | | | |
|---|---|---|---|---|---|
| RU | 2694663 | C1 | | 7/2019 | |
| SE | 1651402 | A1 | * | 4/2018 | ......... B60H 1/00328 |
| SU | 1703940 | A1 | | 1/1992 | |

\* cited by examiner

METHOD FOR CONTROLLING HEAT TRANSFER BETWEEN A MAINLY SOLID BASE AND THE AMBIENT MEDIUM

TECHNICAL FIELD

This invention belongs to the field of construction of shielding and heat-shielding structures, namely to the method for regulating the heat transfer between a mainly solid base and the ambient medium. The invention can be used when carrying out heat control measures aimed at changing the heat transfer between the surfaces of arbitrary purpose objects, such as soils, buildings, engineering structures, equipment, and the ambient medium, as well as between the flows of liquids or gases.

BACKGROUND ART

There is known the design of a canopy protecting against sun and precipitation, disclosed in patent for invention No. RU2209270 (published on 27 Jul. 2003). The known invention suggests using the canopy made of mainly zinc-plated profiled covering and frost-resistant heat-insulating material with a heaving protection band in order to increase the stability of contact line supports erected on heaving soils. The canopy used helps to reduce the amount of heat transferred to the soil. However, the known invention does not provide the ability to control the heat transfer between the soil and the medium depending on the temperature of the medium, it has a limited scope.

There is known a device for the natural accumulation of cold in the soil mass, disclosed in patent for the invention No. RU2694663 (published on 16 Jul. 2019). The known device provides regulation of the intensity of soil cooling under the canopy depending on fluctuations in ambient temperature, but it uses a relatively complex actuator and other components that require external energy sources and stationary operation, which restricts the range of possible areas of application of the invention.

There is known a device for regulating the heat transfer, disclosed in utility model patent No. RU179729 (published on 23 May 2018). The known device is made in the form of two plates aligned with each other and rigidly fixed along two short opposite edges. When exposed to heat above preset temperature, the upper plate bends into an arch, while the lower plate remains essentially unchanged. As a result, an air gap appears between the plates, which reduces the effect of the heat flux to the lower plate and, accordingly, to the surface on which the known device can be installed.

However, the method of operation of this device is not efficient enough, since the useful area of both plates, which are responsible for the formation of a space filled with a medium (in this case, air), is not used in full. The plates are fixed to each other along two short edges, therefore, in the seams formed to connect the plates, the effect of reducing heat transfer is less pronounced in comparison with the main volume of space that appears between the two plates at their deformation.

SUMMARY OF THE INVENTION

The technical problem this invention is aimed to solve consists in providing control of heat transfer between a mainly solid base and the ambient medium through one or more plates depending on the temperature of the ambient medium and the temperature of the base.

The technical result achieved in the implementation of this invention is to change the degree of useful effect from the regulation of heat transfer depending on the temperature of the plates of the heat control structure.

An additional technical result is an increase in the efficiency of using the areas of materials used to manufacture the plates.

The invention discloses a method for controlling heat transfer between a mainly solid base and the ambient medium. In the claimed technique, one plate or at least two superposed and interconnected plates are installed on a mainly solid base at rest temperature. At least one of the mentioned plates is capable of deforming when its temperature changes relative to the rest temperature so that a cavity is formed between this plate and the base or the adjacent plate in the layer, which is filled with particles of the ambient medium. The fixation points of the plate to the base or to the adjacent plate in the layer are selected so that this plate becomes convex during deformation.

For greater clarity, we note that the term "heat transfer" means the physical process of transferring thermal energy from a body with a higher temperature to a body with a lower temperature directly (upon contact) or indirectly (through the area separating the bodies). In this case, such bodies can be solids, liquids, gases (mixtures of gases and/or liquids). The ambient medium may be a body with a higher temperature, and the base may be a body with a lower temperature, and vice versa, which may be due to a specific application task. Therefore, heat transfer can be carried out both from the medium to the base, and from the base to the medium. The regulation of heat transfer is carried out mainly by the area separating the bodies. In the claimed method, this area is formed by one or more plates. Additionally, the said area may include at least one cavity filled with particles of the ambient medium, which is formed during the deformation of at least one plate. The medium may be air, the particles of which fill the cavity formed. In the present description, the terms "ambient medium" and "medium" are used as synonymous.

The term "mainly solid base" means the surface of an arbitrary solid body or solid body as a system with a liquid or gas. The said base may be a flat, contoured or cylindrical surface, as well as a liquid or gas boundary. For example, the base may be soil, ice (melting ice), snow cover, the surface of equipment, buildings, structures, in particular pipes. In this description, the terms "mainly solid base", "base" and the examples of bases presented are used as synonyms.

The term "plate" means a sheet or strip of some hard, resilient material. The shape of the plate can be arbitrary, depending on the nature of the base surface. In the undeformed state at rest temperature, the plate may be flat or have a shape similar to the shape of the base surface on which it is installed in order to fit tightly against the base surface. The capability of the plate to deform is due to the fact that the plate is made of a material characterized by a high coefficient of thermal expansion and low bending stiffness in comparison with the base or adjacent plate in the layer. When using several plates, specific materials and design features can be selected for their manufacture to give the plates different bending and expanding properties relative to each other when exposed to heat. The plate can be a film, that is, have a small thickness. In this case, the term "film" means a thin layer of material having a large ratio of surface area to thickness. The thickness of the plate can also vary, for example, be thinner closer to the center of the plate, or be thinner closer to the edges of the plate.

The term "rest temperature" means a certain temperature or temperature range at which the plate is not deformed relative to the base or adjacent plate, then no cavity is formed. The heat transfer between the medium and the base is the highest at rest temperature.

EMBODIMENT OF INVENTION

Various embodiments of the invention use one or more plates, which are installed on the base at rest temperature. At least one of the said plates is made capable of deforming when its temperature changes relative to the rest temperature. The capability of the plate to deform is due to its design features, properties of the manufacturing material, fixation of the plate to the base, and connection of the plates adjacent in the layer to each other.

For example, the deformable plate may have a low thickness, and the material for its manufacture may be characterized by a high coefficient of linear expansion. Such a material may be selected from the following exemplary group: polyethylene, fluoroplastic, polyamide, polyvinyl chloride, acetal, acrylic, but are not limited to these examples. However, it is also possible that two plates are used, the first of which is made of a material with a high coefficient of linear expansion, and the second one is made of a material with a low coefficient of linear expansion (for example, steel), and both plates are at least partially pressed against each other and interconnected along the perimeter, for example, by fasteners at some fixation points. The first plate deforms more severely when exposed to temperature than the second one, but since both plates are interconnected, the deformation of the first plate also leads to the deformation of the second one. Note that the thickness or some other design feature of the second plate must be selected to promote the plate bending.

The non-deformable plate is made to resist bending as much as possible when exposed to heat. It can be achieved by design methods of increasing the stiffness of the structure, such as reinforcement, angles, profiles, as well as by the use of materials with a low coefficient of linear expansion, high bending stiffness, large value of Young's modulus, that is, the ability of the material to resist tension, compression during elastic deformation. Such materials may be selected from the following exemplary group: steel, granite, diamond, invar, mica, wood, but are not limited to these examples.

The plates can be installed on the base in one or more layers with the formation of vertical cascades, as well as in several lines in parallel, in series, in chessboard pattern, or in another way with the formation of lateral cascades.

Solid or composite sheets are preferably used as deformable plates and solid or composite sheets, strips are preferred as non-deformable plates, since their rigidity can be adjusted using such structural elements as threads, rods, and profiles. Several non-deformable strips can be used in one layer to fix one or more deformable plates on them. Threads can be used as an alternative to strips. Strips or threads can be installed along the perimeter of a certain base area, in diagonal directions for rectangular areas, or in arbitrary directions for base areas of arbitrary shape. The deformable plates can be located on one side or on both sides of the non-deformable plate, interleaved and alternated with each other to form various combinations of mutual arrangement of deformable and non-deformable plates.

When using a single deformable plate in a layer, the plate can be connected to the base at arbitrary points during installation, which provide the formation of a domed or arched shape for the plate when its temperature changes relative to the rest temperature. To provide a dome-shaped plate, the fixation points can be selected near the vertices of the geometric figure of this plate. To provide an arched shape, the fixation points can be selected along opposite faces of the deformable plate. Additionally, fixation points can be selected in arbitrary parts of the plate, for example, in the center of the plate surface. The plate can be fixed at the fixation points with stops or hooks. Stops can be profiled beams with angle profile. Also, the plate can be fixed with fasteners such as bolts, nuts, screws, screw-nails, self-tapping screws, dowels, rivets, washers, pins, studs, and clamps. Fixation points can also be obtained by permanent joint methods such as welding, soldering, pressing, and gluing, without limitation.

When using more than one deformable plate in a layer, the plates can be connected between them at arbitrary points, which provide the formation of a domed or arched shape for the deformable plates when their temperature changes relative to the rest temperature. The points are also selected depending on what shape of the deformable plate is required: near the vertices of the geometric figure of the deformable plate, along opposite faces or all faces of the deformable plate, in arbitrary parts of the plate. When installed on the base, the lower plate in the layer may not be rigidly connected to the base. Stops, hooks or fasteners, as well as permanent joint methods can be used to provide a rigid joint.

When the temperature of the deformable plate changes relative to the rest temperature, the deformable plate becomes longer, but stops, hooks or fasteners counteract its elongation, so it deforms.

Figure 1A:
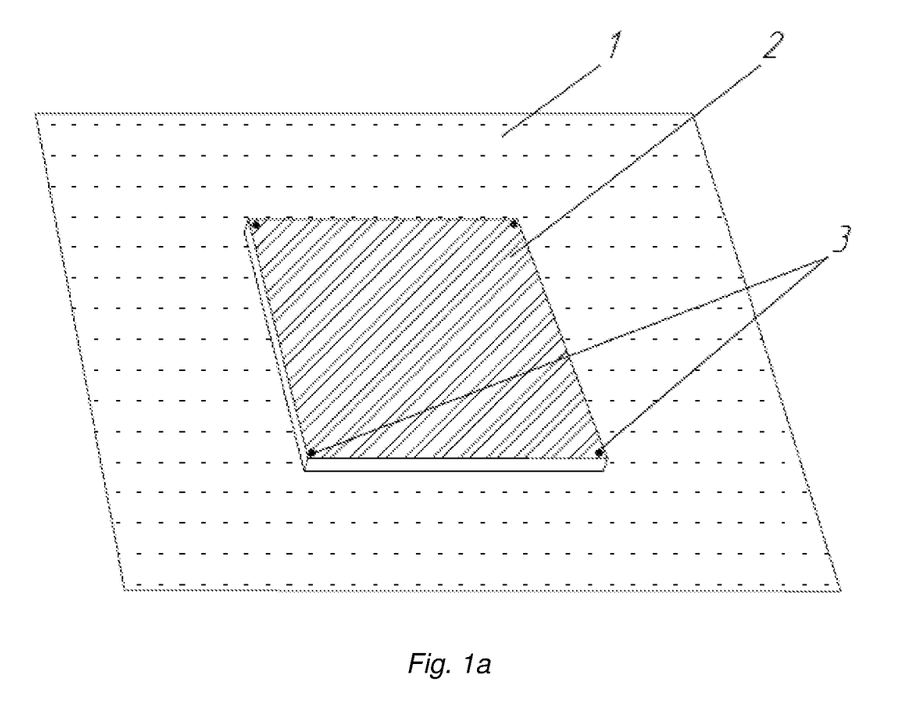
FIG. 1a and FIG. 1b illustrate a structure that uses a single flat plate to control heat transfer between the base and the medium.

FIG. 1a illustrates a particular embodiment of the invention, in which one plate, represented by deformable flat plate 2, is installed on base 1 and fixed on the base at the fixation points so that the area of plate 2 covers the base. The plate is installed at rest temperature so that in the initial state the plate fits tightly against the base. Plate 2 is made of polyethylene, as the material with the highest coefficient of thermal expansion.

Figure 1B:
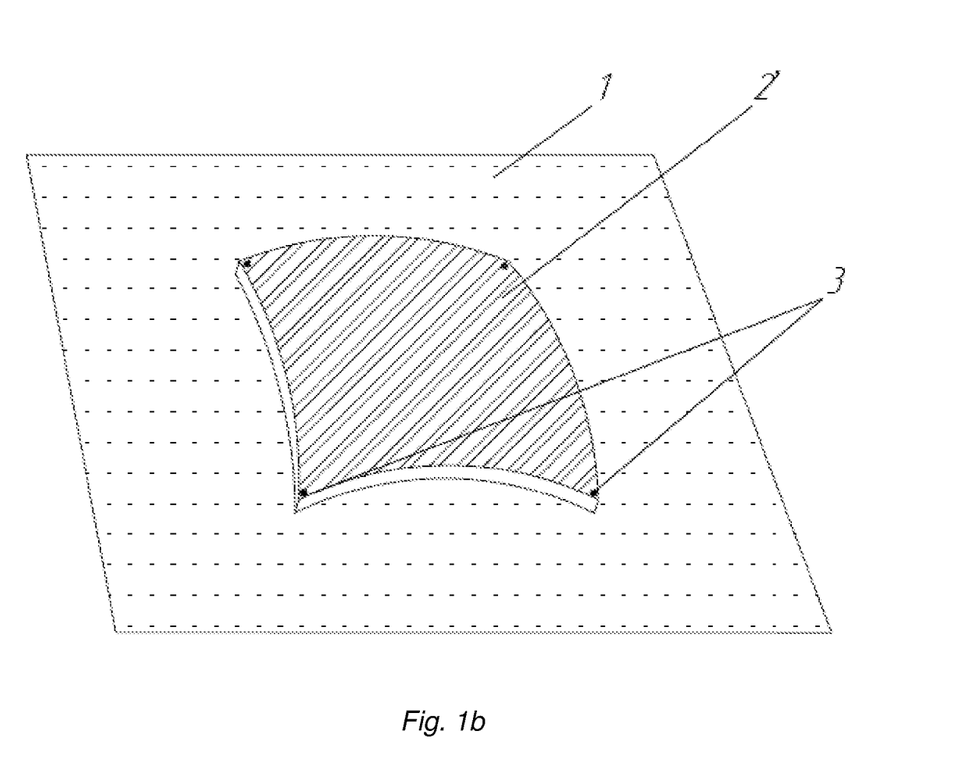

In particular, the plate can be fixed on the base at four fixation points, the position of each of which is selected near the vertices of the geometrical shape of plate 2. The plate can be rigidly fixed at these points to the base using fasteners 3. The geometric figure of plate 2 may be a rectangle. In this case, deformed plate 2', as illustrated in FIG. 1b, takes the upward convex shape, namely a domed shape, when the rest temperature is exceeded. With an increase in the number of fixation points 3 selected on two opposite faces of the plate, the plate can take an arched shape during deformation.

The domed shape of deformed plate 2' may be more preferable, since in this embodiment the contact area between the plates or the plate and the base is the smallest, hence the heat transfer due to thermal conductivity is also less. At the same time, the volume of the cavity arising under plate 2' is larger in comparison with the arched form, since with the arched form there are always more points of contact between plate 2' and base 3.

In particular, the plate can be fixed on base 1 by means of stops or hooks fixing plate 2 on the base at several points selected among the fixation points along the perimeter of the plate. The stops keep plate 2 from displacement during its elongation. Due to the force counteracting the elongation of plate 2 on the side of the stops, the plate begins to bend. The stops can fix plate 2 on base 1 on two opposite sides or on four sides in various configurations. Similar to the embodiment with fasteners 3, deformed plate 2' can also take a domed or arched shape when it is fixed to the base with stops.

Fixing plate 2 to base 1 using stops may be more preferable, since in this embodiment the contact area between the plate and the base is the smallest, while the volume of the cavity that appears under plate 2' is larger compared to the connection using fasteners 3, since plate 2' is always partially pressed against the base at the fastening points.

Notes regarding the use of stops and fasteners are also valid for other embodiments of the invention.

Figure 2A:
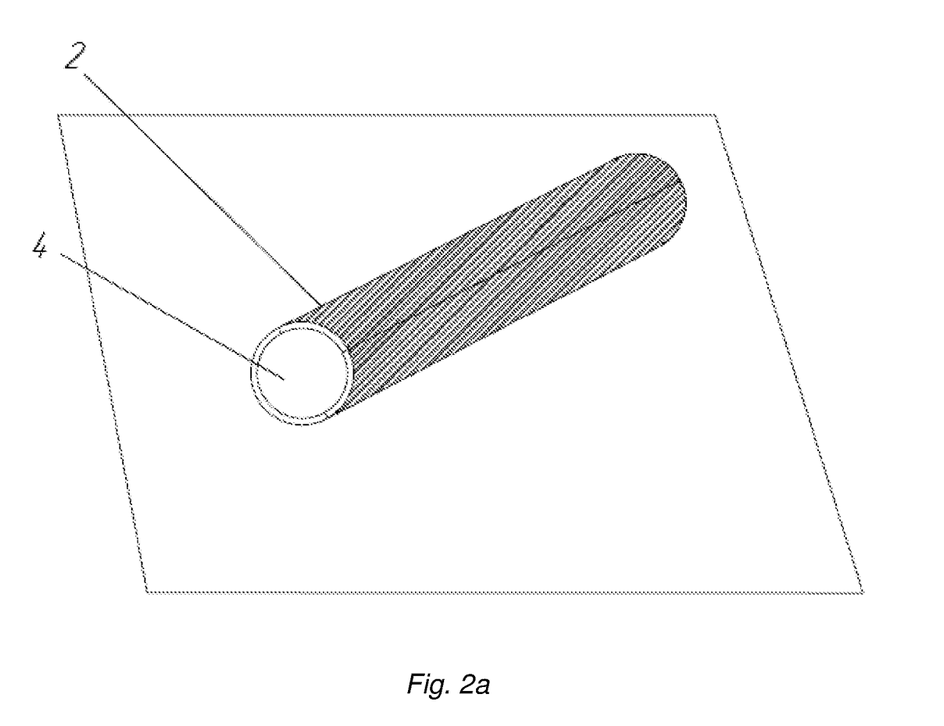
FIG. 2a and FIG. 2b illustrate a structure using multiple plates mounted on a cylindrical base in a single layer.
Figure 2B:
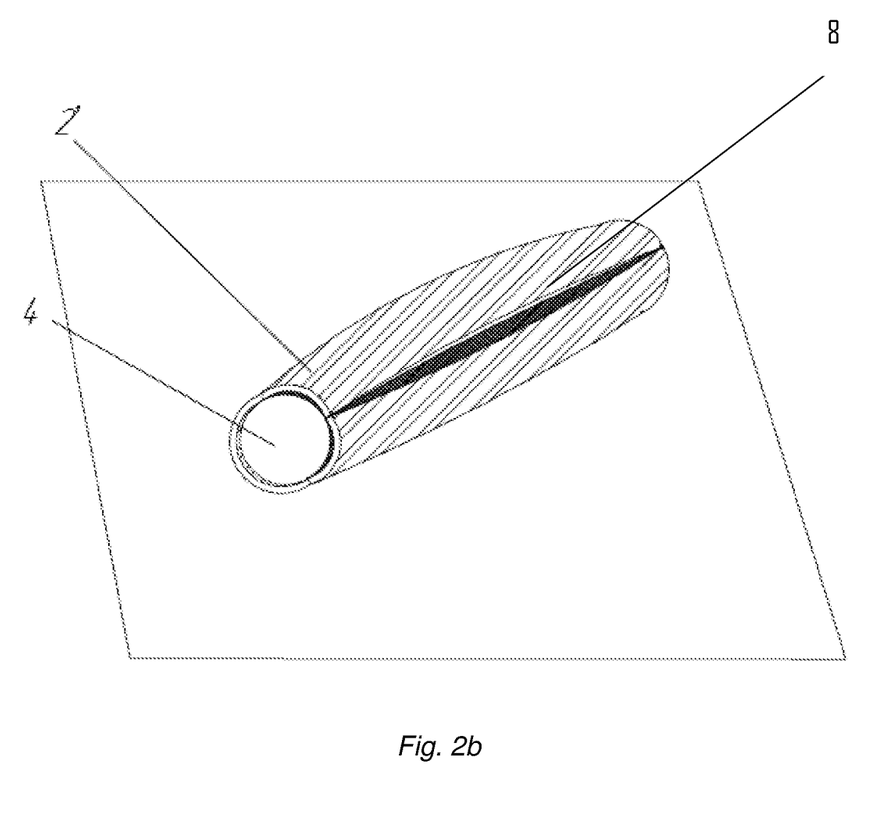

FIG. 2a illustrates a particular embodiment in which the base is represented by cylindrical pipe surface 4. The plate installed on the base is bent in an arc so as to be similar to the cylindrical surface of the base at rest temperature. Several adjacent plates are used to cover the pipe surface. In this embodiment, the plate is fixed around the pipe with fasteners at fixation points selected near the opposite sides of the plates. FIG. 2b shows that when the rest temperature is exceeded, deformed plate 2' takes a convex shape.

Figure 3A:
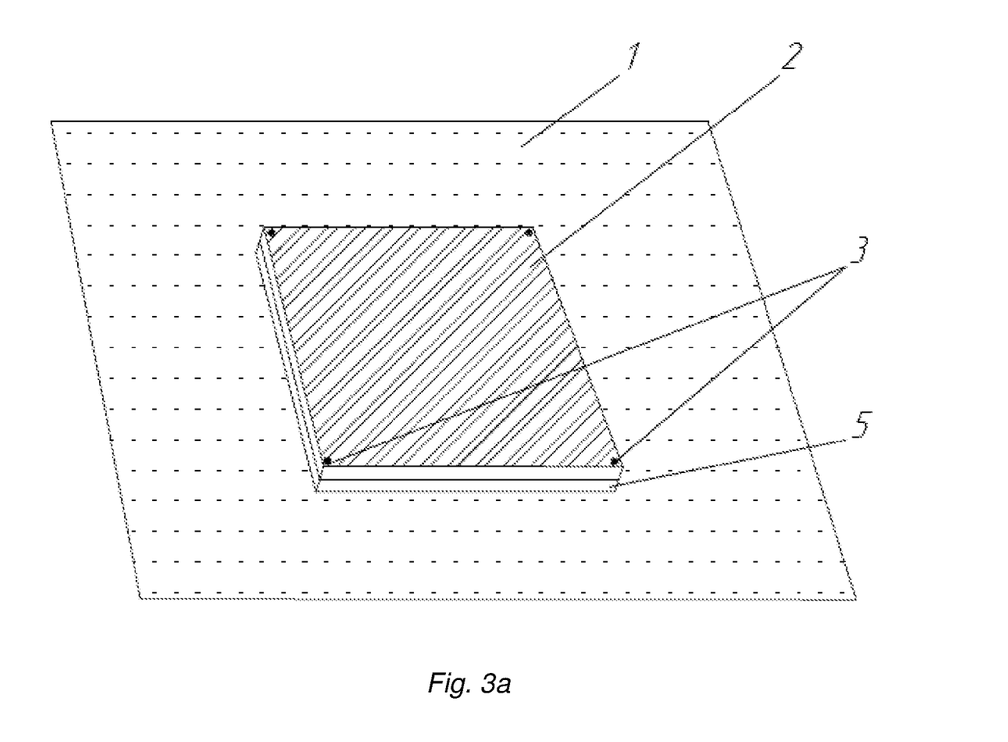
FIG. 3a and FIG. 3b illustrate a structure in which two superposed flat plates are used to control heat transfer between the base and the medium, where one of the said plates is deformed when the rest temperature is exceeded.
Figure 3B:
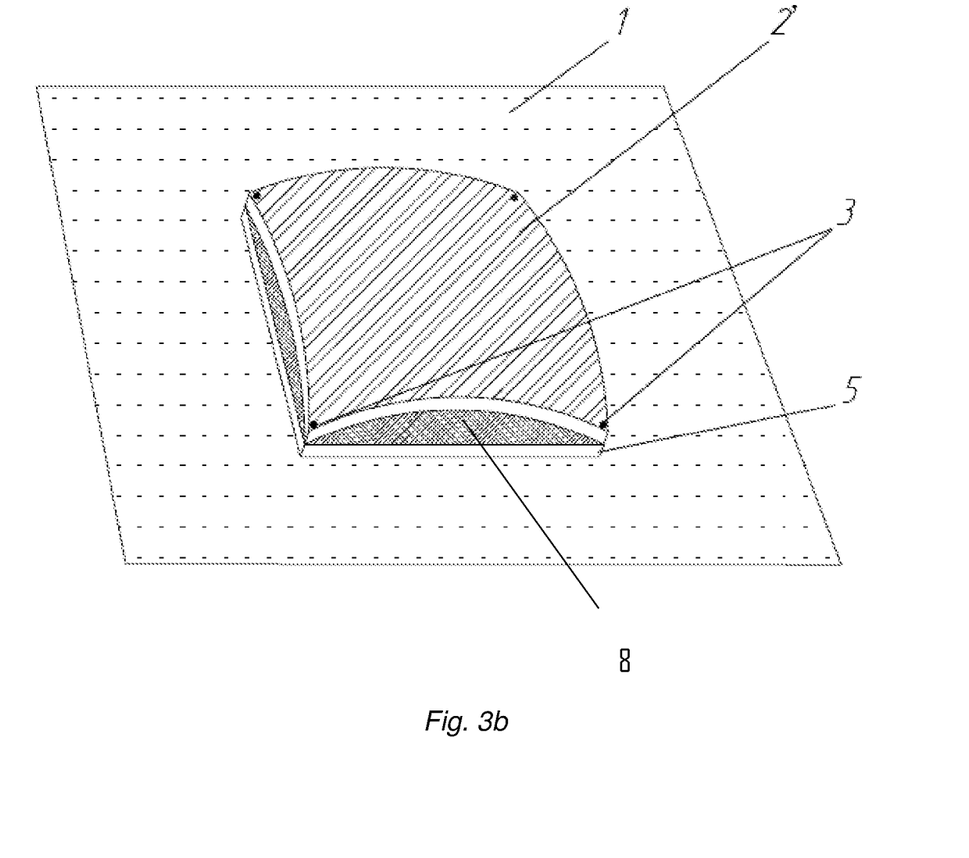

FIG. 3a illustrates a particular embodiment in which two superposed and interconnected plates are used, while upper plate 2 in the layer is a deformable plate, and lower plate 5, installed on the base, is non-deformable. The fixation points of the plates to each other are selected near the corners of plate 2. Lower plate 5 may not have a rigid joint with base 1, since the plate itself acts as a solid base for plate 2. FIG. 3b shows that when the rest temperature is exceeded, deformed plate 2' takes a domed shape.

Figure 4A:
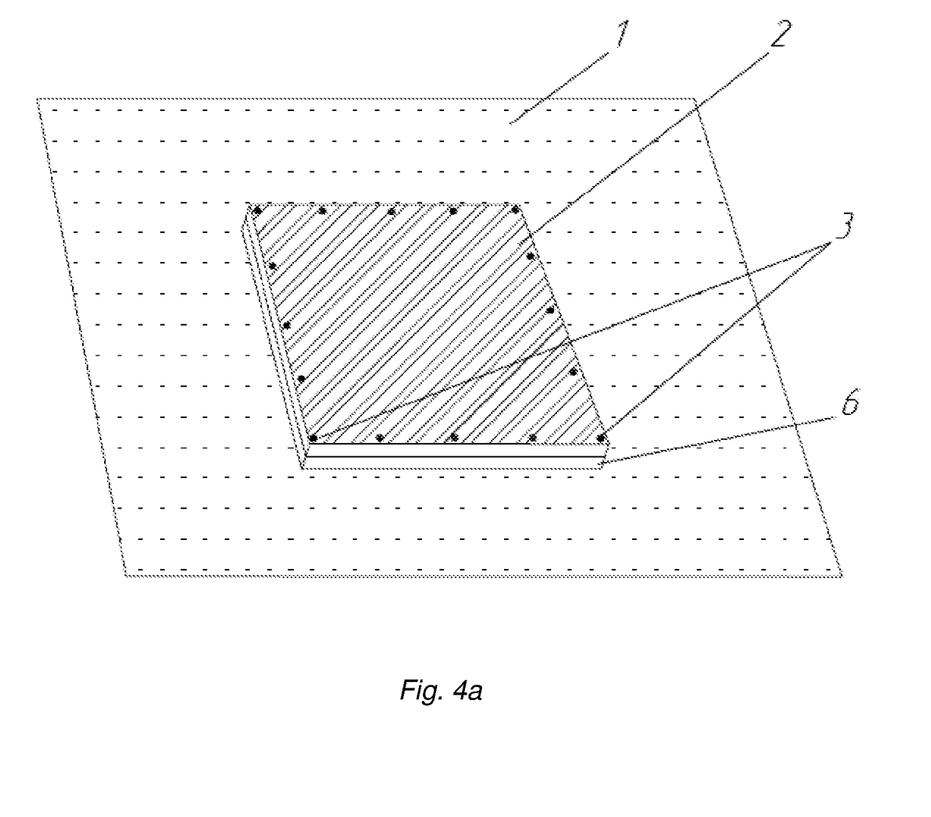
FIG. 4a and FIG. 4b illustrate a structure in which two superposed flat plates are used to control heat transfer between the medium and the base, where both said plates are deformed when the rest temperature is exceeded.
Figure 4B:
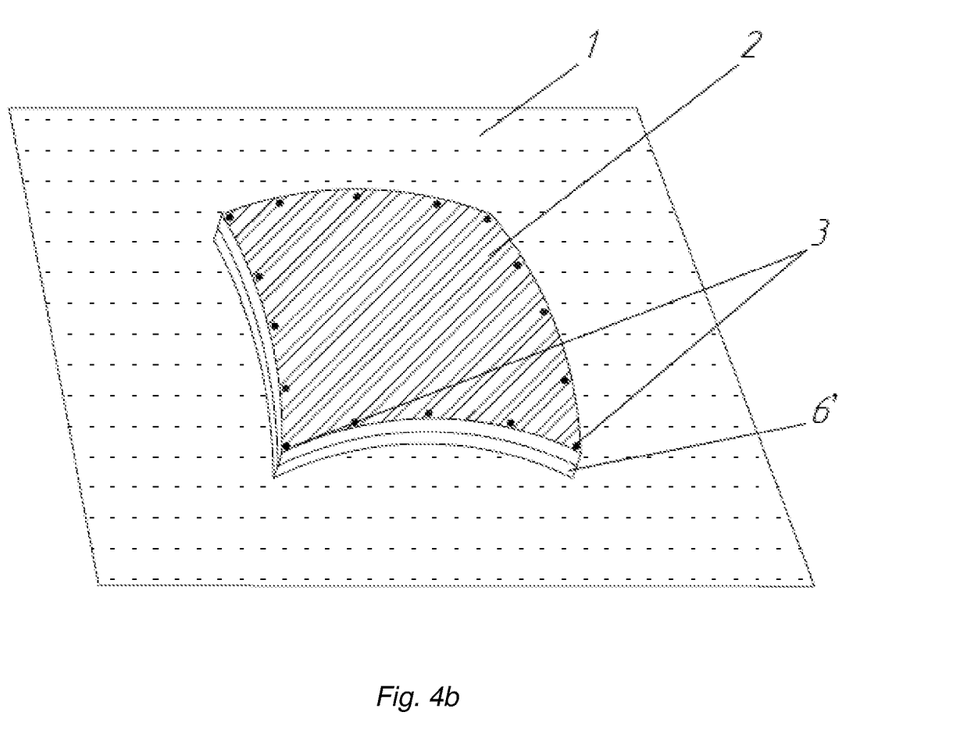

FIG. 4a illustrates a particular embodiment in which two superposed and interconnected plates 2 and 6 are used, both plates 2 and 6 being deformable ones. The fixation points of the plates to each other are selected along all their faces. Plates 2 and 6 may have different coefficients of thermal expansion, bending stiffnesses and Young's moduli. In the illustrated embodiment, when the rest temperature is exceeded, upper deformable plate 2 has a higher coefficient of linear expansion than lower deformable plate 6, so plate 2 elongates more than plate 6. As shown in FIG. 4b, this leads to the formation of a cavity between deformed plate 6' and base 1, while no cavity is formed between the plates 2' and 6'. However, if fewer connection points are selected between plates 2 and 6, a cavity can also be formed between them.

Figure 5:
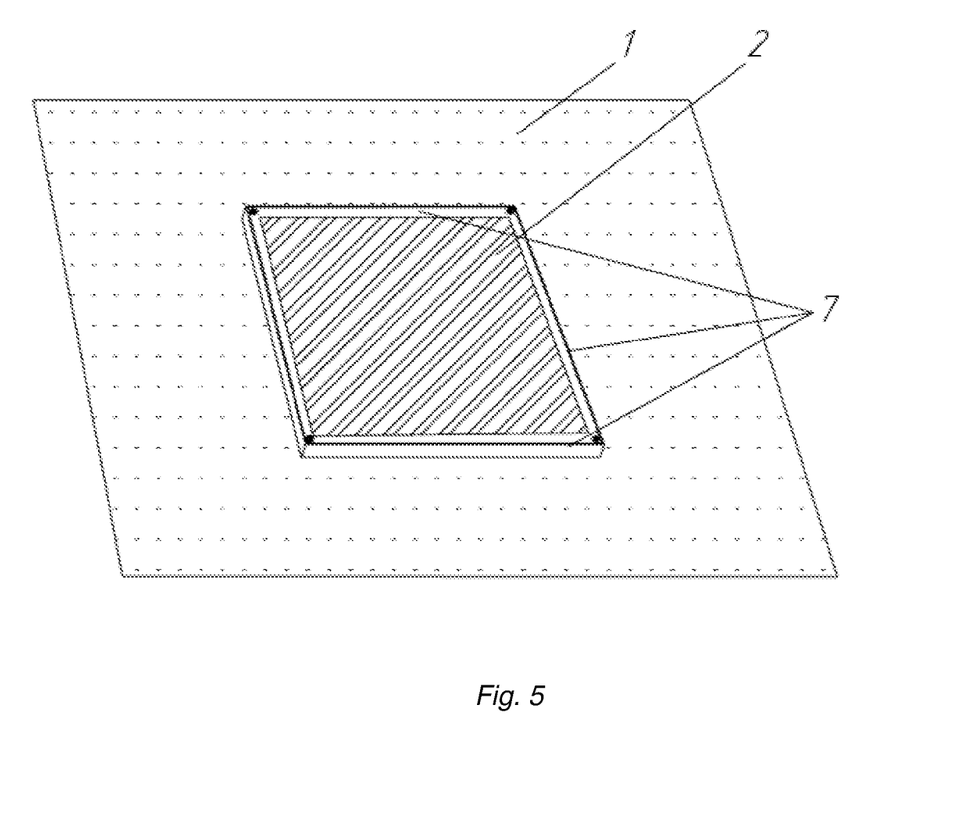
FIG. 5 illustrates a structure in which several plates laid in two layers are used to control heat transfer between the medium and the base, where the lower plates are made in the form of strips installed along the perimeter of a certain area of the base, and the upper plate is made in the form of a sheet installed on the lower plates.

FIG. 5 illustrates an embodiment in which several plates laid in two layers are used, lower plate 2 being deformable and the upper ones are non-deformable plates 7 represented by strips located along the perimeter of plate 2 and holding it on the base when it is expanding.

However, a similar embodiment is possible (not illustrated by the figures), in which several plates laid in two layers are used, where the lower plates are non-deformable and represented by strips 7 located along the perimeter of a certain area of base 1, and upper plate 2 is deformable, connected at arbitrary points with the lower plates and covers base area 1. In order to cover a larger area of base 1, a frame of arbitrary configuration can be erected from lower plates 7, to which the deformable plates are then connected.

Figure 6:
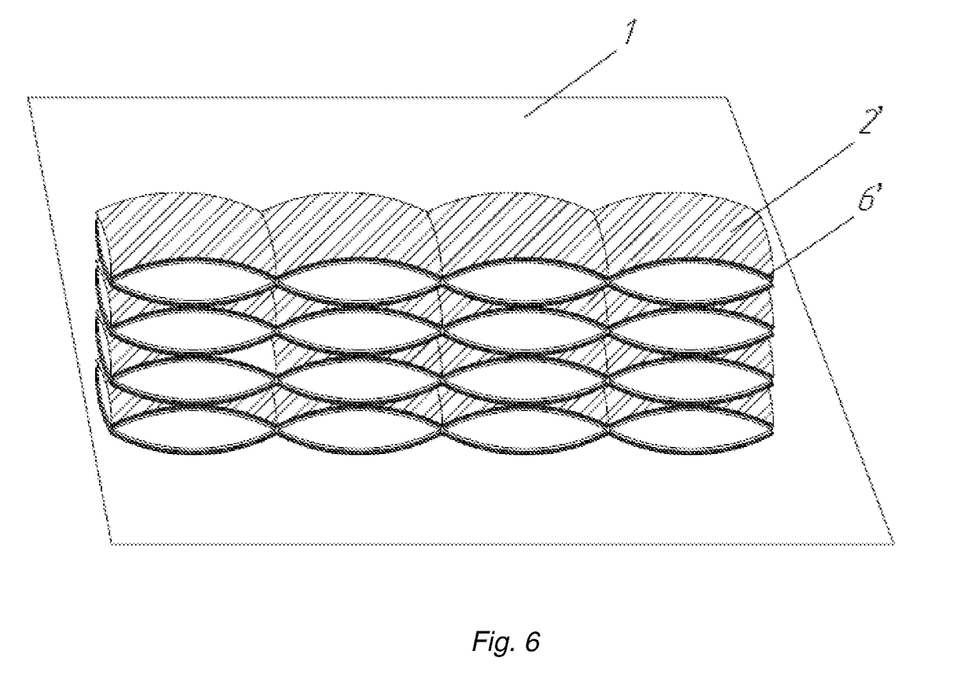
FIG. 6 illustrates a structure in which superposed plates are used to form vertical and lateral cascades.

FIG. 6 illustrates an embodiment using a multitude of deformable plates forming vertical and lateral cascades. Each deformable element of the cascade consists of two deformable plates 2 and 6 (as shown in FIG. 4a and FIG. 4b). Varying the values of the coefficient of linear expansion, bending stiffness and Young's modulus for plates 2 and 6 makes it possible to provide an upward or downward convex shape for the deformable elements. So, if plate 2 has a higher coefficient of linear expansion than plate 6, the deformable element of the cascade takes an upward convex shape during deformation. If the deformable element of the cascade is turned in such a way that plate 6 is at the top and plate 2 is at the bottom, it takes a downward convex shape during deformation. As a result, a structure is obtained in which the useful effect is much more pronounced due to a larger number of cavities formed and a decrease in the edge effect due to adjacent plates.

The regulation of heat transfer in the claimed method is based on the following principles.

When one or more plates are deformed, at least one cavity is formed, which is filled with particles of the medium, while the medium can be either a liquid or a gas (mixture of gases). The resulting cavities reduce the conductive heat transfer between the base and the ambient medium through the heat control structure. Conductive heat transfer (thermal conduction) is a physical process in which thermal energy is transferred from more heated parts of the body to less heated parts of the body through the chaotic movement of body particles (atoms, molecules, electrons, etc.). In the implementation of this invention, the conductive heat transfer is reduced because, first, the gas or liquid has a low thermal conductivity (mainly lower than a solid body), thus, the resulting cavity forms an additional heat-insulating layer, and, second, the thickness of the heat-insulating layer increases with increasing temperature difference between the temperature of the structure and the rest temperature.

The low height of deformed plate 2' reduces convective heat transfer, for example, between plate 2 and base 1 or adjacent plate 5. Convective heat transfer is a physical process in which thermal energy is transferred by jets and flows of a liquid or gaseous medium. In order to further reduce convective heat transfer, plate 2 can be provided with anti-convection shutters 8 mounted on the edges of plate 2. The said shutters 8 close the cavity formed during the deformation of plate 2 in order to reduce the intensity of the air flow movement under plate 2; at the same time, the shutters 8 additionally shade the surface of base 1 from thermal radiation.

Deformed plate 2' also functions as a sunshield, which provides shading to the base and prevents it from heating up under the influence of direct or diffused sunlight, or thermal radiation of another nature. To counteract the heating of any plate by thermal radiation (such as solar radiation), the surface of the plate may be designed to have a high albedo value—light reflectivity. This ability can be provided by a reflective coating, layer applied on the plate, or by manufacturing the plate of a reflective material. The said coating may be a layer of light-colored fluoroplast, aluminum foil, reflective paint, which completely or partially covers the surface of the plate. In other particular cases, the ability of the plate to reflect light can be provided by the color filler of the plate material, for example, filler particles in polyethylene, or by the physical properties of the material, for example, metallic luster for metals. If the structure uses several plates, all or several plates may be manufactured to have light reflectivity.

In the opposite case, when it is necessary to promote the heating of the plate under the influence of thermal radiation, its surface is made with a low albedo value—light absorbing ability. If the structure uses several plates, all or several plates may be manufactured to have light absorbing ability.

The decrease in conductive and convective heat transfer from the medium to the base 1, as well as the protection of the base 1 from thermal radiation, leads to a decrease in the overall coefficient of heat transfer from the medium to base 1. The higher is the temperature of the structure, the higher are the height of the structure and the volume of the resulting cavity.

To increase the intensity of heat exchange between the plate and the medium, the surface of the plate can be provided with artificial irregularities that increase the heat exchange area by the type of radiator (flat, cylindrical or another shape), which can also play the role of anti-convection shutters at the moment when the structure is in the deformed state.

In order to remove the medium, which is warmer than the ambient medium, from the cavities of the structure, drainage holes may be provided in the plates, through which, by means of natural convection, the warm medium is drained and replaced by a colder one from the outside.

Also, for a tighter fit of the plates to each other, holes may be made in the upper plate, which coincide in shape with the irregularities of the lower plate. The Irregularities can protrude through the said holes above the upper plate for more intense heat transfer when the structure is in the undeformed state.

When the rest temperature is reached, the plate becomes shorter and the height of the dome or arch is reduced to the minimum relative to the base. At the same time, the flat plate fits tightly against the base, it provides a reliable thermal contact over the entire area of their contact. Due to a high coefficient of thermal conductivity of the plate material, the conductive heat transfer increases due to the exclusion of the cavity and, consequently, the removal of the heat-insulating layer between plate 2 and base 1. The total overall heat transfer coefficient of the entire structure increases.

The vertical and lateral cascades shown in FIG. 6 further reduce the edge heating effects from the base areas not covered by the plates and provide a larger volume of internal cavities filled with particles of the medium, which increases the overall thickness of the structure and, consequently, the thickness of the heat-insulating layer.

Thus, the claimed method reduces the heat transfer between the base and the medium through the structure when its temperature changes relative to the rest temperature, and increases the heat transfer between the base and the medium through the structure when the temperature of the structure approaches/reaches the rest temperature. Through improvements related to the shaping of deformable plates, selection of fixation points, use of various fasteners and other advantages described above, this invention allows the degree of useful effect of heat transfer control to be varied depending on the temperature of the heat control structure.

It should be noted that this invention is not limited to the above examples of embodiments and can be supplemented with other attributes without deviating from its essence expressed by the claim. This description is only intended to illustrate that various embodiments are possible without any limitation.

The invention claimed is:

1. A method for regulating heat transfer between a mainly solid base and an external ambient medium, where one plate or at least two plates stacked in layers and interconnected are installed on the mainly solid base at a rest temperature, while the one plate or the at least two plates, when the plate temperature changes relative to the rest temperature, is are capable of deforming so that a cavity is formed between the one plate or the at least two plates and the mainly solid base or between adjacent layers in the at least two plates, filled with particles of the ambient medium, and the fixation points of the one plate or the at least two plates to the mainly solid base or the at least one plate to a plate adjacent in the layer are selected so that the one plate or the at least two plates takes a convex shape during deformation, and wherein a thickness of the cavity increases with increasing temperature difference between the temperature of the one plate or the at least two plates and the rest temperature, and wherein the deformation of the one plate or the at least two plates is unconstrained away from the fixation points, wherein said one plate or at least two plates are configured to deform based on temperature change between the solid base and the external ambient medium, and wherein the deformation is caused by temperature change of the external ambient medium.

2. The method according to claim 1, where the one plate or the at least two plates are a flat plate at rest temperature.

3. The method according to claim 1, where the shape of the one plate or the at least two plates is similar to that of the base at rest temperature.

4. The method according to claim 1, where the convex shape of the one plate or the at least two plates is a domed shape.

5. The method according to claim 1, where the convex shape of the one plate or the at least two plates is an arched shape.

6. The method according to claim 1, where the two superposed plates are capable of deforming into an upward or downward convex shape at the same time.

7. The method according to claim 1, where the one plate or the at least two plates are provided with anti-convection shutters.

8. The method according to claim 1, where the one plate or the at least two plates have light reflectivity.

9. The method according to claim 1, where the one plate or the at least two plates haves perforated holes.

10. The method according to claim 1, where the external ambient medium is a gas, of gas mixture or liquid.

11. The method according to claim 1, wherein heat transfer between the solid base and the external ambient medium is regulated due to the particles of the ambient medium contained within said cavity.

12. The method according to claim 11, wherein the heat transfer between the solid base and the external ambient medium is regulated by convection.

13. The method according to claim 1, wherein the particles of the ambient medium filling said cavity are capable of thermally isolating the solid base at intermediate temperatures, when the plate temperature is changed from the rest temperature.

14. The method according to claim 1, wherein a heat flow path is created across the one plate or at least two plates.

15. The method according to claim 1, wherein the one plate or at least two plates are made of a single layer polymeric materials.

16. The method according to claim 1, wherein a heat flow path is established upon initiation of deformation of the one plate or at least two plates.

17. The method according to claim 1, wherein upon initiation of deformation of said one plate or at least two plates, an internal ambient medium is formed within said cavity, whereas said internal ambient medium regulates further deformation of said one plate or at least two plates and thermally isolates the solid base from said external ambient medium.

18. The method according to claim 17, wherein one side of said one plate or at least two plates faces the mainly solid base or the internal ambient medium when said one plate or at least two plates are deformed and another side of said one plate or at least two plates faces only the external ambient medium.

19. The method according to claim 18, wherein said one plate or at least two plates are undeformed at said rest temperature and are of said convex shape when the temperature of the external ambient medium exceeds said rest temperature.

20. The method according to claim 1, wherein said fixation points are selected near the vertices of the geometric figure of said one plate or at least two plates or selected along opposite faces of said one plate or at least two plates.

* * * * *